Nov. 9, 1937.  F. A. DEUTSCH  2,098,416
HYDRAULIC SHOCK ABSORBER
Filed May 9, 1935  2 Sheets—Sheet 1
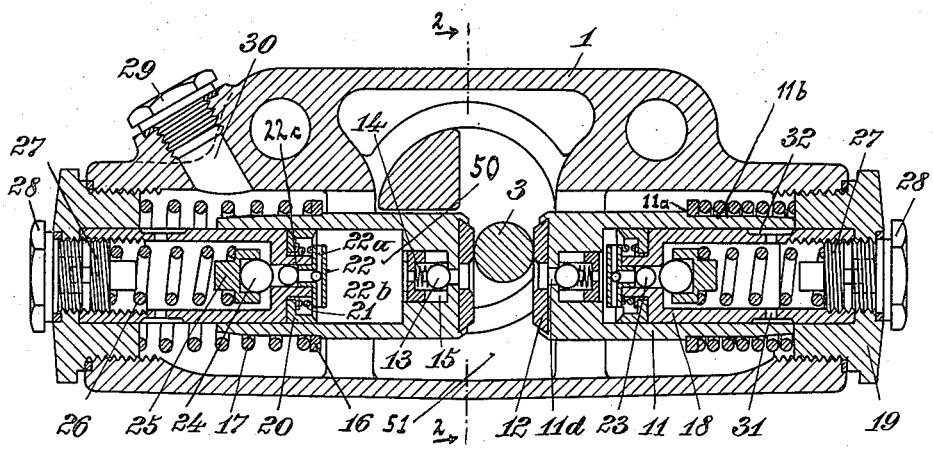
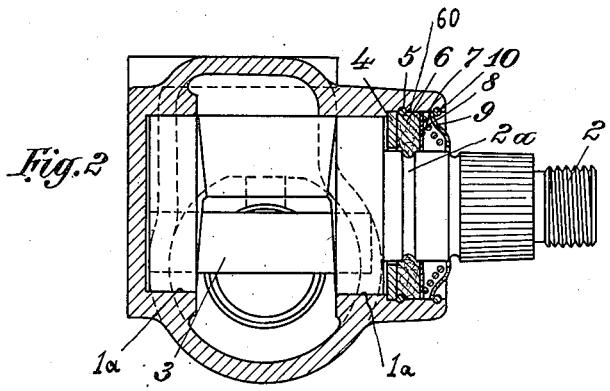
Inventor:
FRITZ ALBERT DEUTSCH
by  Kurt H Feist
his Attorney.

Nov. 9, 1937.  F. A. DEUTSCH  2,098,416
HYDRAULIC SHOCK ABSORBER
Filed May 9, 1935  2 Sheets-Sheet 2
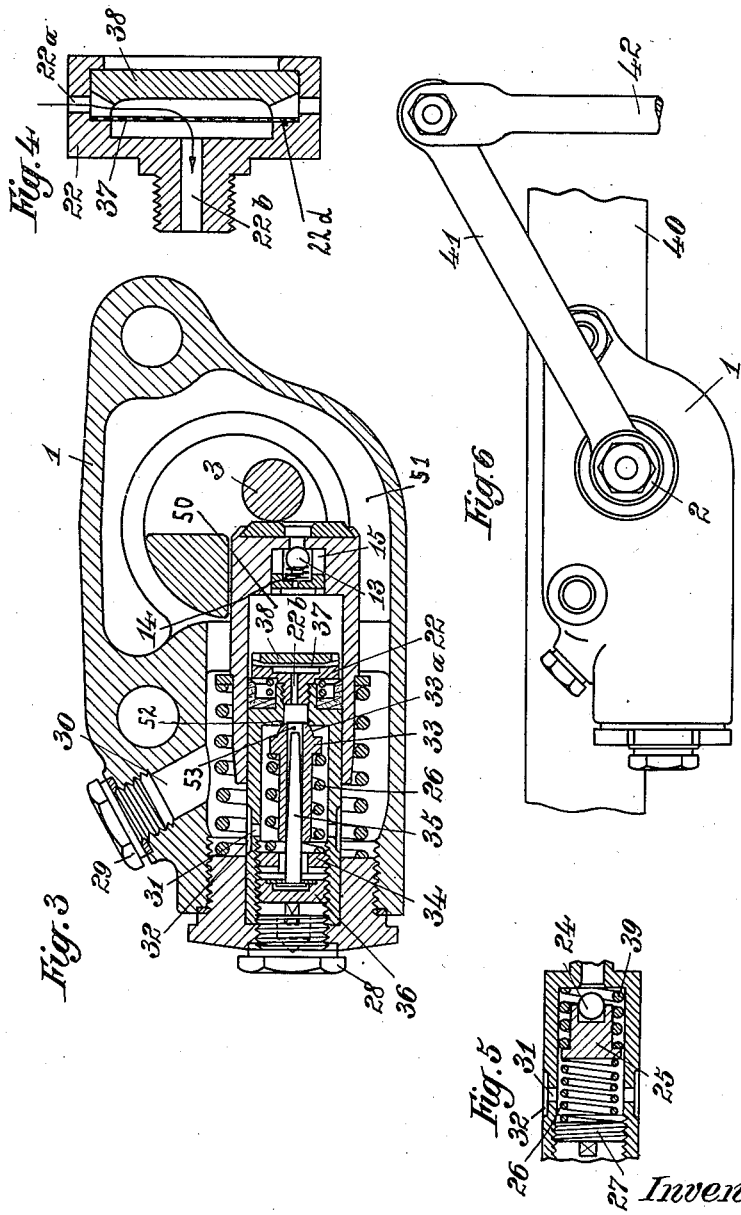
Inventor:
FRITZ ALBERT DEUTSCH
by
his Attorney.

Patented Nov. 9, 1937

2,098,416

UNITED STATES PATENT OFFICE 2,098,416

HYDRAULIC SHOCK ABSORBER

Fritz Albert Deutsch, Berlin, Germany, assignor to Francisco Liebhold, Brussels, Belgium Application May 9, 1935, Serial No. 20,532
In Germany May 9, 1934

13 Claims. (Cl. 267—8)

My invention relates to improvements in shock absorbers and more particularly to hydraulic shock absorbers for vehicles of all kinds, especially for automobiles.

The invention especially relates to a hydraulic shock absorber having a self-tightening packing member on the front face of its piston, which packing member provides a highly efficient closure of the working chamber.

A principal object of the invention is to insure that any air collected in the working chamber will always be removed at once.

A further object of the invention is to provide a compact, space saving, economical and reliable construction of the shock absorber.

In the accompanying drawings which form a part of this specification and in which like characters of reference indicate the same parts:—

Fig. 1 is a longitudinal sectional view of a double acting shock absorber incorporating my invention;

Fig. 2 is a vertical sectional view of the same taken on line 2—2 of Fig. 1;

Fig. 3 is a longitudinal sectional view of a single acting shock absorber incorporating another embodiment of my invention;

Fig. 4 is an enlarged cross sectional view of a detail of the shock absorber shown in Fig. 3;

Fig. 5 is a fragmentary sectional view of the shock absorber shown in Fig. 3, illustrating another embodiment of the regulating means, and Fig. 6 is a side elevation of the shock absorber shown in Fig. 3 mounted on a vehicle.

Referring to Figs. 1 and 2 of the drawings, a shock absorber shaft 2 is journaled in bearings 1a of a casing 1, which forms a reserve oil chamber. The shock absorber shaft 2 is provided with a recess, which receives the hardened stud 3 acting as an operating cam, disposed within the profile of said shaft. A collar 4 mounted on the shaft 2 and secured in its position by a split ring 5 which holds the shaft 2 against an axial displacement. A packing collar 6 of elastic material serves to tighten the shaft 2 and is subjected to the tension of a conical pressure spring 8, one end of which bears against a washer 7 interposed between said packing collar and said spring, the other end of which bears against a closing cup 9 held by a split ring 10. The pressure spring 8 causes such a deformation of the packing collar 6, that the latter tightly bears against the wall of the recess 60 of the casing 1 and the surface of the shaft 2, and furthermore enters into a groove 2a of the latter.

The arrangement just described has the advantages of requiring very little space yet holding the shaft against displacement and efficiently tightening the same.

It is obvious, that the described arrangement of the casing 1 and the shaft 2 provides a unit, which may be produced entirely apart from the hydraulic aggregate of the shock absorber. Said hydraulic aggregate including all parts directly involved in the hydraulic process has the form of a cartridge, which may be inserted into the casing and may be easily replaced for inspection or repairing purposes, if desired.

The cartridge consists of a piston member and a cylinder member movable against each other. One of said two members is of such a construction that it may be connected to the casing, i. e., by attaching said member by screws to the casing, and thus remains stationary during the operation of the shock absorber, while the other member will be reciprocated on the former. In the embodiment selected for illustrative purposes, the piston member forms the member to be connected to the casing. Preferably said piston member receives also regulating means, which determine the resistance to be overcome by the liquid during the operation of the shock absorber, if the liquid will be displaced from the working chamber 50 formed between the cylinder and the piston. The arrangement of said regulating means in the stationary member of the hydraulic aggregate has the advantage, that the efficiency of the shock absorber may be adjusted externally during the operation of the shock absorber.

Referring again to Figs. 1 and 2 the piston 18 is pressed in the closing screw 19 provided with an outside thread, so that the screw together with the piston and the entire hydraulic aggregate may be inserted in the casing 1 and screwed in a threaded hole of the latter. In order to provide a complete tightening of the working chamber 50, a self-tightening packing member 20 is arranged on the front face of the piston 18 and is permanently held in contact with said front face by means of a spring 21. One end of said spring bears against the packing member 20, while the other end thereof bears against a packing holder 22 firmly inserted in a channel 22c arranged in the front wall of the piston 18. Furthermore said holder 22 serves to remove any air collected in the working chamber 50. For this purpose the packing holder 22 is provided with a plurality of radial holes 22a extending from the outside to an axial central hole 22b communicating with the space in front of an automatic ball regulating valve 24. Furthermore a ball 23 is arranged in the channel 22c in front of the ball valve 24. The operation of said ball 23 will be described hereinafter.

The valve 24 is inserted in a valve body 25, against which one end of a regulating spring 26 bears. The other end of said spring 26 bears against a regulating screw 27 screwed in the threaded hole of the piston 18. In order to change the shock absorbing effect, the original tension of the regulating spring 26, which determines the shock absorbing effect, may be easily varied by adjusting the regulating screw 27 after removal of a screw 28 closing the piston hole. The diameter of the cylinder 11 is reduced at the end adjacent to the screw 19, so that a shoulder 11a is formed serving as an abutment for a collar 16 mounted on the reduced part 11b of the cylinder. A pressure spring 17 is interposed between said collar 16 and the screw 19 and tends to bring the movable cylinder 11 in contact with the cam 3.

The cylinder 11 also contains a refilling valve consisting of a ball check valve 13, which is supported by the valve body 15 and is subjected to the tension of a pressure spring 14. Said valve 13 normally closes the channel 11d, which connects the working chamber 50 to the refilling chamber 51 in the casing 1. The front face of the cylinder 11 is provided with a hardened thrust plate adapted to take up the compression stress between the stud 3 and the cylinder 11, so that the cylinder may be made of a relatively soft and inexpensive material.

In order to fill the shock absorber with the operative liquid, the casing 1 is provided with a filling hole 30, which may be closed by a screw plug 29.

The operation of the shock absorber is as follows:—

The casing 1 is equipped with two cartridges, one at each side of the middle axis, so that a retarding of the movement takes place for both directions of rotation of the shaft 2. Referring to Fig. 1, if the shaft 2 is rotated in such a direction, that the stud 3 is moved from its left-hand position into the position as shown in Fig. 1, the tension of the pressure spring 17 will cause a movement of the cylinder 11 to the stud, so that the cylinder reaches the position as shown. During this movement of the cylinder 11 to the right side, the check valve 13 opens and permits the inflow of the operative liquid into the working chamber 50 of the left-hand cartridge to such an extent as the formed space allows. If the shaft 2 then will be rotated in the opposite direction, the movement of the cylinder 11 of the left-hand cartridge will cause the displacement of the liquid from the working chamber 50. The liquid is forced to pass through the radial holes 22a of the packing holder 22, through the axial hole 22b, and past the ball 23 to the automatic ball valve 24. As soon as the pressure of the liquid is high enough in the working chamber 50, to overcome the tension of the regulating spring 26, the valve 24 will open and will allow the outlet of the liquid from the working chamber by a pressure predetermined by the original tension of the spring 26. Then the liquid returns to the reserve chamber through a hole 31 arranged in the piston wall. In order to allow the liquid to return to the reserve chamber in any position of the cylinder 11, even when the cylinder covers the hole 31, the surface of the piston 18 is provided with a groove 32 communicating with the hole 31.

As it is well known, the automatic valve 24 operates in such a way, that it opens and closes in very short intervals according to the pressure existing in the working chamber 50. It is possible that these opening and closing movements quickly succeeding each other produce very disturbing and undesired noises. Such noises will be eliminated by the arrangement of the ball 23, which is positioned with but little play into the channel 22c leading to the automatic valve 24, thus causing a certain throttling of the passing liquid. Said throttling results in a certain retarding of the movements of the valve 24, so that the noises due to the operation of the valve 24 are considerably moderated or even entirely eliminated. It is obvious, that the throttling effect obtained by the ball 23 as just described, also may be carried out with the same success by a corresponding throttling of the connecting channel (holes 22a and 22b) leading to the automatic valve 24 or by any other suitable means.

It is well known, that the entering of air into the working chamber never can be entirely avoided. This air is undesired and prevents an accurate operation of the shock absorber, since air is easily compressible in comparison with liquid and thus reduces or even entirely prevents the desired dampening effect. Therefore care is to be taken for an automatic removal of any air present at any time in the working chamber. This removal will automatically occur, if either the refilling valve or the regulating device is arranged at the highest point of the working chamber. Furthermore, the usual shock absorber constructions not employing packing members allow such a removal of air, as the necessary play between the piston and the cylinder is sufficient to automatically permit the escape of any collected air. This, however, is impossible if the shock absorber is provided with a self-tightening packing member, which tightens the working chamber almost at 100%.

I have found that also in the last mentioned case an efficient and automatic removal of the air may be obtained by forcing the liquid flowing to the regulating device to pass through the highest or approximately highest point of the working chamber, whereby any air present in the working chamber and naturally collected at the highest point thereof will be automatically carried away and removed from the working chamber.

In the illustrated embodiment of the invention said effect is obtained by the radial holes 22a of the packing holder 22. Preferably several holes, i. e. four or five holes 22a, are spaced from each other at uniform angles to insure, that at any time at least one of said holes opens into the highest part of the working chamber, where the air automatically collects.

Referring to Fig. 1 it has to be mentioned, that the right-hand cartridge operates in the same manner as the left-hand cartridge as described, except that the actions are correspondingly inversed. This results in a so-called double acting shock absorber.

Fig. 3 shows a single-acting shock absorber. Like characters of reference indicate the same parts, so that a detailed description of the single acting shock absorber is deemed unnecessary. The embodiment of my invention according to Fig. 3 differs from that as shown in Fig. 1 by the arrangement of a combined throttling and automatic valve regulation instead of only an automatic valve regulation. The new combined regulation operates as follows:—

The front face 33a of the valve body 33 is of spherical shape and is pressed against the valve seat 52 by means of the regulating spring 26, the original tension of which is determined by the position of the threaded slit ring 34 in the piston hole. The valve body 33 has a cylindrical hole 53, into which the conical regulating pin 35 projects, which is secured to the regulating screw 36. The space between the conical pin 35 and the cylindrical axial hole 53 determines the throttling of the passing liquid. The position of the conical pin 35 and therewith the throttling of the liquid or the dampening effect may be adjusted to a predetermined value by turning the regulating screw 36. However, as soon as the pressure of the liquid exceeds a predetermined limit, the valve body 33 will be moved from the seat 52 like an automatic valve and permit the direct flow of the fluid from the working chamber to the refilling chamber.

In order to avoid a choking of the throttling section by impurities, dirt or the like, which the operative liquid may contain, preferably a sieve 37 (Fig. 4) is disposed in the packing holder 22 in the path of the liquid flowing from the working chamber through the radial hole 22a to the axial hole 22b. A plate 38 secured in the holder 22 by the beaded edge of the latter holds said sieve 37 against a shoulder 22d formed in the holder.

Fig. 5 illustrates another embodiment of the regulating means, whereby the valve body 25 carrying the ball 24 is subjected to the tension of a pressure spring 39 in addition to the tension of the pressure spring 26. Said spring 39 has a considerably harder characteristic than the spring 26 and acts in an opposite direction to the spring 26. If the regulating screw 27 is screwed in the piston hole to increase the original tension of the valve spring 26, it will be necessary to move the regulating screw for a considerable distance to obtain only a small movement of the ball 24 towards the ball seat against the tension of the much stronger spring 39. Thus a very fine adjustment of an open annular space of a predetermined value between the ball 24 and its seat is possible, which space offers a throttling resistance of a predetermined value to the liquid displaced from the working chamber. As soon as the pressure of the liquid is equal to or higher than the pressure required by said throttling effect, the valve acts as a normal automatic valve and opens. Since the tension of the spring 39 ceases after a very short travel of the valve ball 24 away from the valve seat, the further opening movement of the valve ball 24 requires the overcoming of the total original tension of the valve spring 26.

Although it is assumed that the mounting of shock absorbers of the described type on vehicles is well known; in Fig. 6 the mounting of a shock absorber as shown in Fig. 3 is illustrated. The casing 1 is fastened to the frame 40 of the vehicle. One end of a lever 41 is fixedly keyed to the free end of the shaft 2, while the other end of said lever is pivoted to the upper end of a link 42, the lower end of which is connected to the wheel axle.

I have shown preferred embodiments of my invention but it is clear, that numerous changes and omissions may be made without departing from the spirit of my invention.

I claim:—

1. In a hydraulic shock absorber of the character described, the combination of a casing having a refilling chamber, a shaft journaled in said casing and provided with actuating means, dampening means substantially consisting of a cylinder member and a piston member, movable against each other and internally forming a working chamber, one of said members being fastened to the casing the other contacting with said actuating means, an automatic refilling valve arranged in the movable member, regulating means to control the dampening effect of said dampening means disposed substantially in the longitudinal axis of the stationary member fastened to the casing, and said stationary member being provided with a connecting channel leading from the substantially highest point of the working chamber to the regulating means.

2. In a hydraulic shock absorber of the character described, the combination of a casing having a refilling chamber, a shaft journaled in said casing and provided with actuating means, dampening means substantially consisting of a cylinder member and a piston member, movable against each other and internally forming a working chamber, one of said members being fastened to the casing the other contacting with said actuating means, an automatic refilling valve arranged in the movable member, regulating means to control the dampening effect of said dampening means disposed in the stationary member fastened to the casing, and said stationary member being provided with an axial bore leading to said regulating means and with a plurality of radial holes, at least one of said holes extending from the substantially highest point of the working chamber to said axial bore.

3. In a hydraulic shock absorber of the character described, the combination of a casing having a refilling chamber, a shaft journaled in said casing and provided with actuating means, dampening means substantially consisting of a cylinder member and a piston member, movable against each other and internally forming a working chamber, one of said members being fastened to the casing the other contacting with said actuating means, an automatic refilling valve arranged in the movable member, regulating means to control the dampening effect of said dampening means disposed in the stationary member fastened to the casing, said stationary member, being provided with an axial bore leading to said regulating means, and an element mounted on said stationary member and provided with a plurality of radial holes, at least one of said holes extending from the substantially highest point of the working chamber to said axial bore of the stationary member.

4. In a hydraulic shock absorber of the character described, the combination of a casing having a refilling chamber, a shaft journaled in said casing and provided with actuating means, dampening means substantially consisting of a cylinder member and a piston member, movable against each other and internally forming a working chamber, one of said members being fastened to the casing the other contacting with said actuating means, an automatic refilling valve arranged in the movable member, regulating means to control the dampening effect of said dampening means disposed in the stationary member fastened to the casing, said stationary member being provided with an axial bore leading to said regulating means, an element mounted on said stationary member and provided with a plurality of radial holes, at least one of said holes extending from the substantially highest point of the working chamber to said axial bore, a packing member mounted on the front face of the stationary member, and a pressure spring interposed between said packing member and said element.

5. In a hydraulic shock absorber of the character described, the combination of a casing having a refilling chamber, a shaft journaled in said casing and provided with actuating means, dampening means substantially consisting of a cylinder member and a piston member, movable against each other and internally forming a working chamber, one of said members being fastened to the casing the other contacting with said actuating means, an automatic refilling valve arranged in the movable member, an automatic valve with an axial bore arranged in the stationary member fastened to the casing, an adjustable conical pin projecting into said axial bore, and said stationary member being provided with a connecting channel leading from the substantially highest point of the working chamber to the regulating means.

6. In a hydraulic shock absorber, the combination of a casing having a refilling chamber, a shaft journaled in said casing and provided with actuating means, a dampening mechanism arranged in said casing, said dampening mechanism comprising cylinder and piston members movable against each other and internally forming a working chamber, one of said members contacting with said actuating means, an automatic refilling valve disposed in one of said members, regulating means disposed substantially in the longitudinal axis of one of said members to control the dampening effect of the dampening mechanism, and one of said members provided with a connecting channel leading from the substantially highest point of the working chamber of the regulating means.

7. In a hydraulic shock absorber, the combination of a casing having a refilling chamber, a shaft journaled in said casing and provided with actuating means, a dampening mechanism arranged in said casing, said dampening mechanism comprising cylinder and piston members movable against each other and internally forming a working chamber, one of said members contacting with said actuating means, an automatic refilling valve disposed in one of said members, regulating means provided in one of said members to control the dampening effect of the dampening mechanism, one of said members provided with an axial bore leading to said regulating means and with a plurality of radial holes, at least one of said holes extending from the substantially highest point of the working chamber to said axial bore.

8. In a hydraulic shock absorber, the combination of a casing having a refilling chamber, a shaft journaled in said casing and provided with actuating means, a dampening mechanism arranged in said casing, said dampening mechanism comprising cylinder and piston members movable against each other and internally forming a working chamber, one of said members contacting with said actuating means, an automatic refilling valve disposed in one of said members, regulating means provided in one of said members to control the dampening effect of the dampening mechanism, one of said members provided with an axial bore leading to said regulating means, and an element mounted on one of said members and provided with a plurality of radial holes, at least one of said holes extending from the substantially highest point of the working chamber to said axial bore.

9. In a hydraulic shock absorber, the combination of a casing having a refilling chamber, a shaft journaled in said casing and provided with actuating means, disposed within the profile of said shaft, a dampening mechanism arranged in said casing, said dampening mechanism comprising cylinder and piston members movable against each other and internally forming a working chamber, one of said members contacting with said actuating means, an automatic refilling valve disposed in one of said members, regulating means provided in one of said members to control the dampening effect of the dampening mechanism, one of said members provided with an axial bore leading to said regulating means and with a plurality of radial holes, at least one of said holes extending from the substantially highest point of the working chamber to said axial bore.

10. In a hydraulic shock absorber, the combination of a casing having a refilling chamber, a shaft journaled in said casing and provided with actuating means, a dampening mechanism arranged in said casing, said dampening mechanism comprising cylinder and piston members movable against each other and internally forming a working chamber, one of said members contacting with said actuating means, an automatic refilling valve disposed in one of said members, an automatic regulating valve with an axial bore arranged in one of said members, and an adjustable pin projecting into said axial bore.

11. In a hydraulic shock absorber, the combination of a casing having a refilling chamber, a shaft journaled in said casing and provided with actuating means, a dampening mechanism arranged in said casing, said dampening mechanism comprising cylinder and piston members movable against each other and internally forming a working chamber, one of said members contacting with said actuating means, an automatic refilling valve disposed in one of said members, an automatic regulating valve with an axial bore arranged in one of said members, an adjustable pin projecting into said axial bore, and one of said members provided with a connecting channel leading from the substantially highest point of the working chamber to the regulating valve.

12. In a fluid shock absorber, the combination of a casing forming a refilling chamber and having an opening in its wall, an abutting shaft extending into said casing and provided with oscillatable actuating means, and a retarder unit adapted to be substantially completely housed within said casing and in the form of a cartridge axially insertible into and removable from the casing through said opening and comprising relatively movable piston and cylinder members forming therebetween a working chamber and a spring surrounding said members and arranged between abutting faces of the latter, one of said members being held in said opening in a concentrical arrangement with respect to said opening, regulating means to control the escape of the working fluid from the working chamber into the refilling chamber arranged in the stationary member held in said opening, an automatic refilling valve disposed in the movable member, the stationary member provided with an axial bore leading to said regulating means, an element mounted on said stationary member and provided with a plurality of radial holes, at least one of said holes extending from the substantially highest point of the working chamber to said axial bore, the inner end of said movable member being adapted to have an operative abutting contact with said operating means whereby the insertion and removal of said unit may be effected freely and independently of the other parts of the shock absorber.

13. In a hydraulic shock absorber, relatively movable piston and cylinder members forming therebetween a compression chamber, and means for scavenging the air entrained in the liquid in the compression chamber upon the compression stroke and for providing a substantially noiseless by-passing of the liquid in the hydraulic circuit, said means including two fixed low resistance choke orifices, two expansion chambers, and a relatively high value adjustable resistance arranged between the two expansion chambers and in series with the low value chokes, and actuating means in constant engagement with one of said members to produce relative movement therebetween.

FRITZ ALBERT DEUTSCH.